(12) United States Patent
Albert et al.

(10) Patent No.: US 6,256,435 B1
(45) Date of Patent: Jul. 3, 2001

(54) POLARIZATION INSENSITIVE GRATING IN A PLANAR CHANNEL OPTICAL WAVEGUIDE AND METHOD TO ACHIEVE THE SAME

(75) Inventors: Jacques Albert, Hull; Francois Bilodeau, Nepean; Kenneth O. Hill, Kanata; Derwyn C. Johnson, Nepean; Stephen J. Mihailov, Ottawa, all of (CA)

(73) Assignee: Her Majesty the Queen in right of Canada, as represented by the Minister of Industry, Ottawa (CA)

( * ) Notice: Subject to any disclaimer, the term of this patent is extended or adjusted under 35 U.S.C. 154(b) by 0 days.

(21) Appl. No.: 09/421,234

(22) Filed: Oct. 20, 1999

(51) Int. Cl.$^7$ .................................................. G02B 6/34
(52) U.S. Cl. .............................. 385/37; 385/11; 385/129
(58) Field of Search .................................. 385/37, 11, 10, 385/12, 14, 16, 129, 123, 132, 130; 359/248; 372/22; 430/321, 5

(56) References Cited

U.S. PATENT DOCUMENTS 5,940,568 * 8/1999 Losch .................................. 385/37 X
5,972,542 * 10/1999 Starodubov .............................. 430/5

* cited by examiner

Primary Examiner—Phan T. H. Palmer
(74) Attorney, Agent, or Firm—Freedman & Associates

(57) ABSTRACT

A method is disclosed wherein optical structures such as Bragg gratings can be written into planar waveguides disposed on a substrate. By employing the method of this invention, a polarization insensitive device can be made. Such relatively thin planar waveguides disposed on a substrate are inherently polarization sensitive and the structure itself is birefringent. By writing structures in the waveguides or by simply writing a refractive index change in the waveguide by limiting the beam width at the waveguide layer to less than or equal to the thickness of the waveguiding layers on the substrate, in combination with conventional wider beam writing techniques, polarization sensitivity can be lessened or obviated.

10 Claims, 4 Drawing Sheets

POLARIZATION INSENSITIVE GRATING IN A PLANAR CHANNEL OPTICAL WAVEGUIDE AND METHOD TO ACHIEVE THE SAME

FIELD OF THE INVENTION

This invention relates to planar optical circuits and more particularly to a method for lessening unwanted polarization dependence within planar waveguides of such circuits.

BACKGROUND OF THE INVENTION

The invention is directed to a method for modifying the refractive index of planar optical waveguides by ultraviolet light irradiation, including but not restricted to forming an optical structure such as a Bragg or long period grating. More particularly, the novel method includes steps, which can minimize birefringence effects normally associated with writing such structures in multi-layer devices supported by a relatively thick substrate.

The sensitivity of optical waveguide fibers to light of certain wavelength and intensity has been known since the late 1970's. It was found that the loss characteristic and refractive index of a waveguide fiber could be permanently changed by exposing the waveguide to light of a given wavelength and intensity. A publication which describes the effect and how it may be used is, "Light-sensitive optical fibers and planar waveguides", Kashyap et al., BT Techno., 1, Vol. 11, No. 2, Apr. 1993. The publication discusses the making of light-induced reflection gratings, page 150. section 2.1, and notes that the amount of refractive index change increases as light wavelength is reduced from 600 nm to 240 nm, where the photosensitivity of the waveguide appears to peak, with the notable exception of irradiation using strong 193 nm light where the photosensitivity can be very large (as demonstrated by Malo et al. Electron. Lett. Vol. 31, p.879 (1995)).

In "Bragg grating formation and germanosilicate fiber photosensitivity", SPIE V. 1516,Intn'l Workshop on Photo-induced Self-Organization Effects In Optical Fiber, Meltz et al., 1991, the mechanism and magnitude of photosensitivity is discussed (page 185, first paragraph, section 1.). This publication also discusses an interferometric technique of writing gratings (pp. 185–6, section 2.) At page 189, first paragraph, a measurement of induced birefringence is presented. See also FIG. 6 of that publication. Another publication, "Characterization of *UV-induced birefringence* in photosensitive Ge-doped silica optical fibers", Erdogan et al., J. Opt. Soc. Am. B/V.11, No. 10, Oct 1994, notes the dependence of induced birefringence on the orientation of the polarization direction of the light incident upon the waveguide fiber. In particular, data presented in the publication shows that the induced birefringence is greatest when the polarization direction is oriented perpendicular to the long axis of the fiber and least when the polarization direction is parallel to the long axis of the fiber. See FIG. 3*a*. and FIG. 4. of the publication.

The Erdogan et al. publication points out that the induced birefringence polarization anisotropy can be used to make such devices, "as polarization mode converters and rocking filters", page 2100, first paragraph. However, in devices using resonant propagation, "the birefringence can result in substantial polarization dependence of resonant grating properties, such as reflectivity", page 2100, first paragraph.

The Erdogan, et al., data shows that even in the configuration where the polarization direction is along the long axis of the waveguide, some birefringence is still induced in the waveguide. Comparing the curves of FIG. 3*a*. and FIG. 4., the non-polarization dependent induced birefringence is a factor in the range of about 4 to 12 smaller than the polarization dependent induced birefringence. However, even this smaller amount of birefringence is undesirable. A more versatile and effective grating would result from a writing method which produces a grating having minimal birefringence.

Notwithstanding, polarization effects or sensitivity from irradiating waveguides in multi-layer structures exhibited as a result of disposing a relatively thin waveguide comprised of an assembly of material layers supporting low loss light propagation deposited on a thick substrate comprised of a material having different characteristics from those of the deposited layers, is significantly more evident and problematic than the effects and causes described by Erdogan et al. It is this polarization sensitivity caused by mismatching and thickness differences in layered material that is addressed by this invention.

Planar optical circuits, often termed planar lightwave circuits (PLCs) are well known and for particular applications some of which include optical gratings formed therein, such as Bragg gratings, or long period gratings. Since most signals propagating through optical fiber have an indeterminate polarization state, it is preferred that the gratings through which these signals propagate, be substantially polarization insensitive. J. Albert et al., the applicants have disclosed in a paper entitled "Polarization-independent strong Bragg gratings in Planar Lightwave Circuits" Electron Lett. 34, 485–486 (1998), a method of lessening the polarization dependence or "polarization sensitivity" of planar waveguides having Bragg gratings formed therein. By using an intense ArF excimer laser a refractive index change is produced and is birefringent. This birefringence is large enough and of the proper sign to compensate the inherent birefringence exhibited in most PLCs.

Notwithstanding, in the instant invention the birefringence can be controlled independently of the size of the index change. An instance where this control is particularly useful is in the path length trimming of a Mach-Zehnder interferometer that is initially polarization independent. Of course it is preferred that the trimming be non-birefringent to maintain the polarization independence of the device. However, this invention can be used in other phased array devices, or arrayed wave guides (AWGs), requiring similar polarization insensitively in the arms of the AWG.

Planar waveguides usually have different propagation constants for TE (transverse electric) and TM (transverse magnetic) waveguide modes and therefore are known to be polarization sensitive. Stated more simply, the response of these waveguides differs for orthogonally polarized light beams. For wavelength multi/demultiplexers, this difference in propagation constants results in a wavelength shift in the spectral response peak or the passband of each wavelength channel. This wavelength shift is sensitive to the design of the planar waveguide, and can be as large as 3 nm. As WDM systems are being designed towards smaller and smaller channel spacing (from 1.6 nm to 0.8 nm or even less in the future), even a small polarization dependent wavelength shift (e.g. 0.3~0.4 nm) is of concern.

Quite surprisingly, the inventors of the instant application have discovered that the size of the beam, relative to the size of the waveguide in which a grating is to be photo-induced, greatly affects the polarization dependence of the grating or structure being written into the waveguide. For example, photo-induced birefringence occurs when irradiating a planar waveguide as described with a beam of suitable intensity having a spot size that is substantially greater than the width of the waveguide region. In some instances this birefringence offsets or compensates for the birefringence present in the planar waveguide prior to irradiation. However, most often, when writing an optical structure by photoinducing a refractive index change in the waveguide using current techniques, the amount of photo-induced birefringence cannot be accurately controlled; achieving as a desired refractive index change An does not always occur at the point where irradiation of the waveguide induces a birefringence that yields a substantially polarization insensitive device. However, by utilizing conventional techniques of irradiating with a beam sized larger than the waveguide width in combination with irradiating the waveguide with a smaller beam spot size less than or equal to the width of the waveguide channel, improved control over the polarization sensitivity of the device can be afforded. In fact, a polarization insensitive device can be manufactured. This technique is not only limited to writing gratings such as Bragg and long period gratings, but can be used to induce an index change to realize many other possible structures. In summary it is now possible to irradiate a planar waveguide as described heretofore, with a beam having a narrow or reduced width substantially equal or less than the width of the waveguide core in combination with a beam of a substantially greater width to obviate polarization senstivity.

It is therefore, an object of this invention, to provide a method for writing Bragg gratings and other optical structures while independently controlling the amount of birefringence induced by the irradiation. An important but not exclusive use of the invention is to substantially lessen or eliminate polarization dependence at a wavelength of interest normally associated with such structures disposed in planar waveguides.

It is a further object of the invention, to provide a photo-induced Bragg gratings having little or essentially no polarization dependence at a wavelength of interest.

The following definitions may be helpful for the understanding of this specification.

An optical waveguide grating is a periodic cyclic or aperiodic variation in refractive index of the waveguide along the long axis of the waveguide.

Photo-sensitivity is an interaction between certain glass compositions and selected light wavelengths wherein incident light permanently changes the refractive index or the loss characteristics of the irradiated glass.

Side writing is a technique for forming a grating in an optical waveguide fiber wherein light is caused to form a periodic series of alternating light and dark fringes along the long axis of the waveguide. An example of such a periodic series is an interference pattern formed on the side of a waveguide fiber and along a portion of the long axis of a waveguide fiber. The periodic light intensity pattern, produced by the light interference, induces a periodic change in refractive index along a portion of the long axis of the waveguide fiber.

A planar lightwave circuit (PLC) is a waveguide having a core with a substantially square or rectangular cross section and having a cladding material of a lower refractive index surrounding the core, the whole assembly being deposited and adhering to a substrate whose thickness is substantially larger than the thickness of the waveguide layers.

PLCs are generally more polarization dependent than optical fibres having substantially cylindrically symmetric cross sections with a core centered along the axis of symmetry. PLCs suffer both form birefringence due to the planar geometry and from material birefringence associated with fabrication processes where non equal thermo-elastic coefficient between the substrate and waveguide lead to residual strains.

It is an object of this invention to provide a planar waveguide structure having a grating or other wavelength dependent structure disposed therein, wherein the polarization sensitivity of the function of the structure is controlled to a desired value. A particular important example being that the structure be substantially polarization insensitive.

SUMMARY OF THE INVENTION

In accordance with the invention, there is provided, a method of inducing a region of modified refractive index in a planar waveguide device comprising the steps of:
providing a planar waveguide comprised of layers affixed to a substrate layer, wherein at least one of
(a) an optical property,
(b) density, and
(c) thermal coefficient of expansion of the substrate differs from that of the planar waveguide layers, the planar waveguide layers being substantially thinner than the substrate layer, the planar waveguide layers having a composite thickness of $t_l$ $\mu$m; and,
irradiating the waveguide with a narrow beam of light and ensuring that the beam of light incident upon the planar waveguide is restricted to a width no greater than $t_l$ $\mu$m as the beam of light impinges upon the planar waveguide.

In accordance with the invention there is further provided, a method of providing an optical structure in a planar waveguide device comprising the steps of:
providing a layered structure having a composite thickness $t_l$ which includes a thin waveguiding core layer surrounded by cladding layers, the core layer having a thickness $nt_l$ where n<1.0, the layered structure being affixed to a substrate of thickness greater than $mt_l$ where m>5; and, irradiating a portion of the waveguiding core layer with a beam of light for a sufficient duration and with a sufficient intensity to permanently change the refractive index of regions within the waveguiding core layer of the portion, the beam having a spot size of less than $t_l$ In accordance with the invention, a method of providing an optical structure in a planar waveguide device comprises the steps of:
providing a layered structure having a substrate layer of a thickness t=hd sand a substantially thinner waveguiding core layer surrounded by a cladding having a combined thickness of $t_l$; and,
irradiating a portion of the waveguiding core layer with a beam of light for a sufficient duration and with a sufficient intensity to permanently change the refractive index of regions within the waveguiding core layer of the portion, the beam having a diameter upon the planar waveguide device wherein 95% if its power is confined to an area of less than or equal to $t_l$.

In accordance with yet another aspect of the invention, there is provided, a method of providing an optical structure in a planar waveguide device comprising the steps of:
providing a layered structure having a substrate layer of a thickness $t_s$ and a substantially thinner waveguiding core layer surrounded by a cladding having a combined thickness of $t_l$; and,
irradiating a portion of the waveguiding core layer with a beam of light for a sufficient duration and with a sufficient intensity to permanently change the refractive index of regions within the waveguiding core layer of the portion, the beam having a diameter having a non-uniform intensity pattern that varies radially, the light energy impinging upon an area of a dimension $t_l$ or less over the waveguide core being substantially different from the light energy impinging upon other areas of the waveguide layers. Conveniently, by employing the techniques of limiting the beam width impinging a waveguide disposed on a planar substrate in the maimer that will be described, polarization sensitivity can be lessened or obviated and controlled.

Hence, the method of this invention can be useful in controlling the amount of birefringence present in a planar waveguide.

BRIEF DESCRIPTION OF THE DRAWINGS

Exemplary embodiments of the invention will now be described in conjunction with the drawings in which:

FIG. 4a is a graph illustrating Power (dB) versus wavelength (nm) for Bragg gratings written with UV-induced birefringence ON;

DETAILED DESCRIPTION

Figure 1:
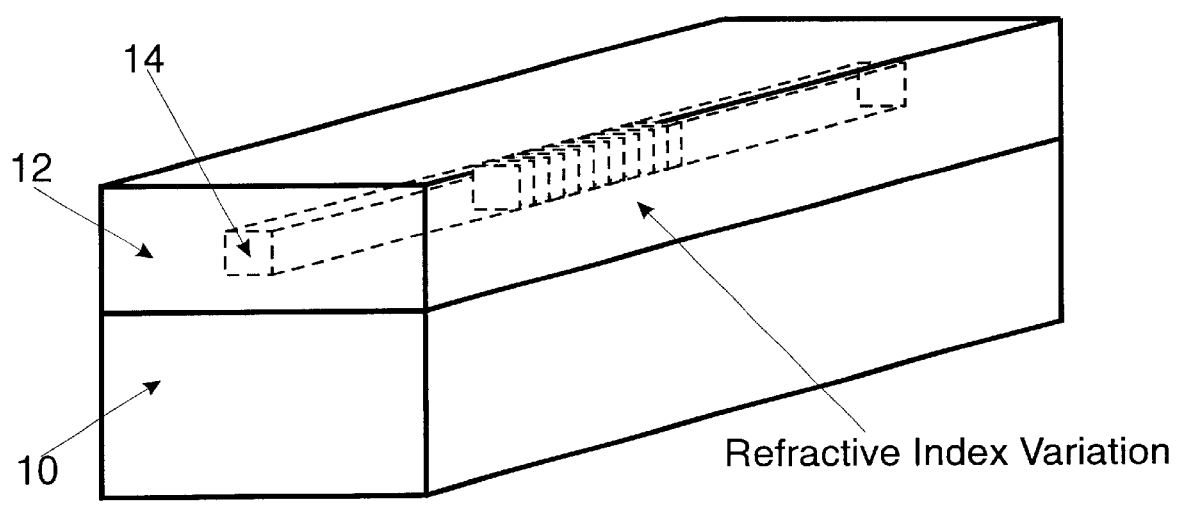
FIG. 1 is a perspective view of a planar optical waveguide device in accordance with an embodiment of the invention, having refractive index grating disposed within a region of the waveguide core.

Referring now to FIG. 1 a planar waveguide device in the form of a PLC is shown having a substrate layer 10 a cladding layer 12 and a core layer 14 having a higher refractive index than the surrounding cladding layer 12. Disposed within a region of the core layer 14 is a grating having a refractive index variation that may be periodic or aperiodic. The writing of a permanent grating in a waveguide can be done through the use of a variety of well known techniques, such as by using a phase mask, an amplitude mask, or by using multiple beam interference techniques.

Figure 2:
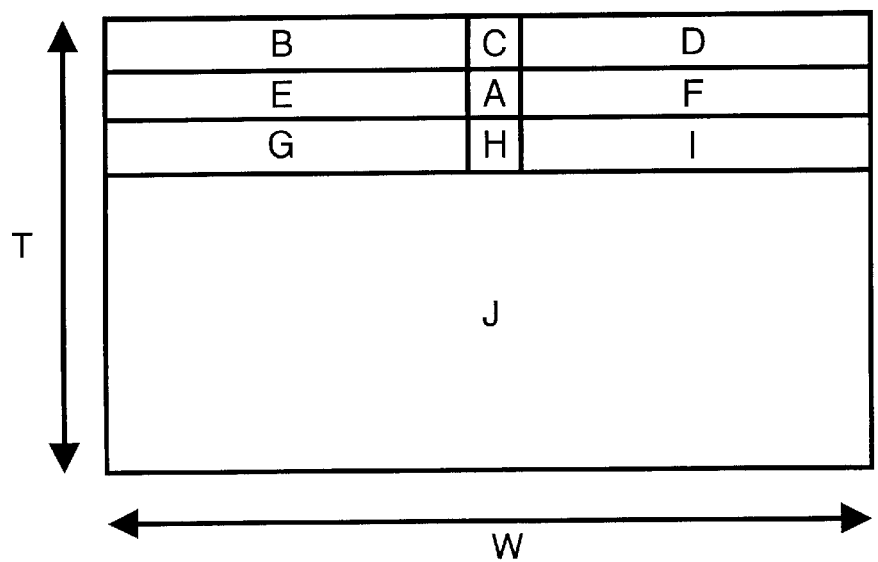
FIG. 2 is a cross-sectional view of the planar optical waveguide device shown in FIG. 1.

FIG. 2 illustrates a cross-section of the device shown in FIG. 1, perpendicular to the axis of the propagation of the waveguide; hence, the section labeled as "a" is an end-view of the longitudinal core section. Apart from the grating (not illustrated in this figure), there is no refractive index variation along the propagation axis, or varying on a scale much longer than the wavelength of the guided light, such as adiabatic tapers or bends with radii or at least 0.1 mm. In the exemplary embodiment shown, all lines are straight and intersect at right angles, however the waveguides can in practice have many different shapes, and can have varying cross-sectional dimensions. In FIG. 2 the waveguide "a" is a light transmissive core layer where most of the light launched therein is confined by the relative refractive difference between "a" and the cladding materials "b" to "i" surrounding the core layer. The structure is fabricated on supporting substrate "j" which is planar and which is substantially thicker; Thickness "T" is smaller than width "W", both quantities being significantly larger than any of the core cross-section dimensions. This invention provides a remedy for the problems of high polarization sensitivity resulting from material and thickness differences between the core and supporting substrate and conventional grating writing practices.

In preferred embodiments of this invention, the substrate material provides mechanical strength to the waveguide layer typically made of a different material. The deposition of the glasses on the substrate can be performed in any of several ways; what is important is that glass layer(s) adhere to the substrate. In the instance where the deposited glass and the glass substrate material were nominally the same (e.g. silica), they would still be considered "different" materials in the sense that the substrate has been prepared in bulk form and as a result has different physical properties (density, thermal expansion coefficient, etc . . . ) than the light guiding layers. Analysis reveals in order to control the amount of birefringence of the light irradiated region of the waveguide, at least some of the irradiation must be carried out in such way that the width of the beam irradiating the waveguide region should be less than beam widths typically used in conventional waveguide writing techniques. In order to determine a suitable range of beam widths that will control the polarization sensitivity, the critical beam width where one changes the sign of the induced birefringence is related to the thickness of the deposited glass layers. To determine a preferred range, the following criterion is utilized: UV-induced birefringence is "ON" or present when the laser spot width is larger than twice the total deposited layers thickness and "OFF" or when the spot width is less than the total deposited layers thickness.

Figure 6:
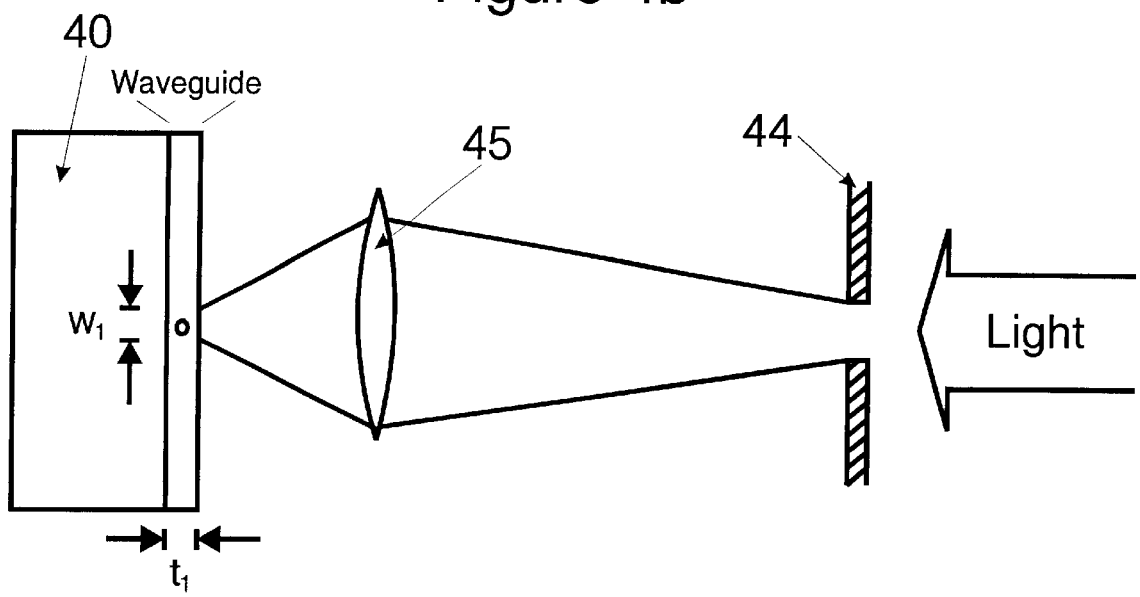

Controlling the beam width can be achieved in a number of ways: A preferred method is by use of an aperture or amplitude mask disposed in the beam path before the last substantially focusing lens used to concentrate the laser light on the sample in the system Turning now to FIG. 6 a light beam is shown directed toward a waveguide chip 40, and more particularly to within a region confined to a width $w_1$ over the core of the waveguide chip which is equal to the combined thickness of the layers upon the substrate. An aperture 44 and lens 45 combination conveniently provide a means of confining the beam to have a desired diameter upon the waveguide region. When $w_1$ the beam width, is less than $t_l$ the light induced refractive index change is substantially non-birefringent.

It is possible to control the beam width using non-phase mask based methods such as those that generate the interfering UV beams. The use of a blocking mask disposed adjacent to the surface of the waveguide device is less preferred and is considered to be unpractical due to the high laser power density at that location. It is also undesirable to use the magnifying power of a lens because one needs independent control of beam spot size and power density.

Figure 3A:
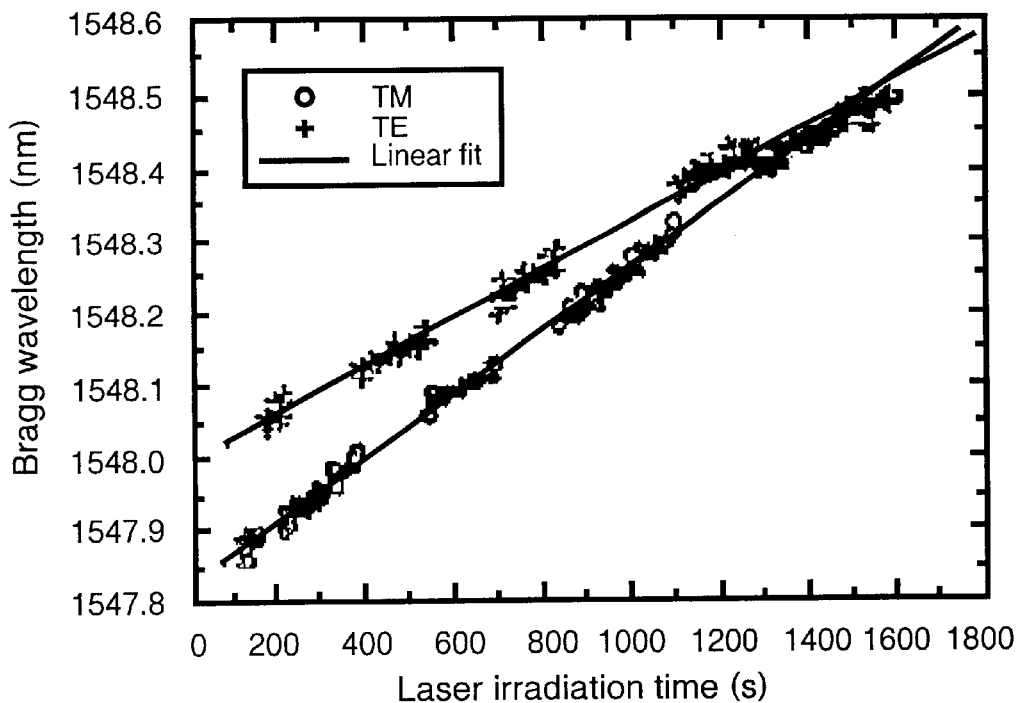
FIG. 3a is a graph illustrating Bragg wavelength (rim) versus laser irradiation time (s) for a laser spot width of 100 $\mu$m illustrating the relationship between TE and TM modes.
Figure 3B:
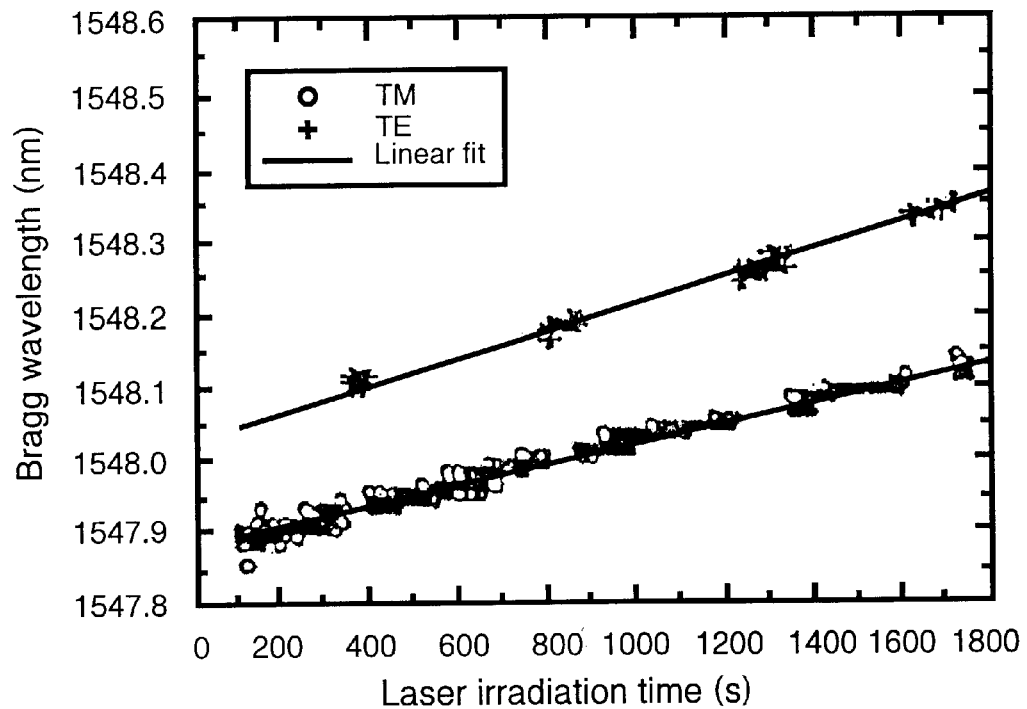
FIG. 3b is a graph illustrating Bragg wavelength (nm) versus laser irradiation time (s) for a laser spot width of 15 $\mu$m illustrating the relationship between TE and TM modes.
Figure 5:
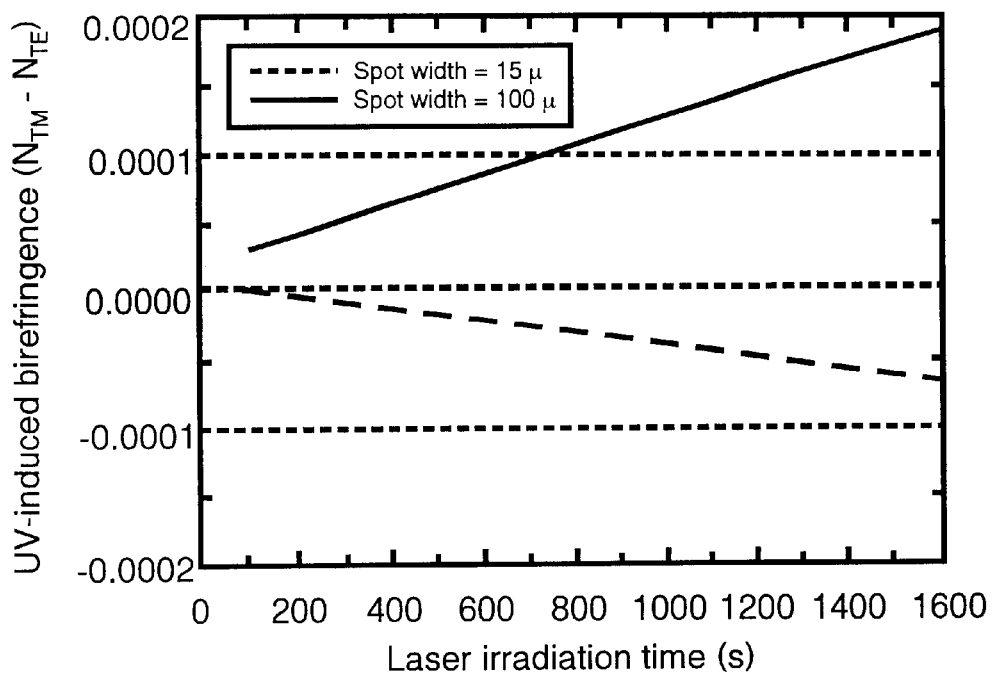
FIG. 5 is a graph of UV-induced birefringence versus laser irradiation time; and, FIG. 6 is a diagram illustrating the irradiation of a waveguide region in accordance with an aspect of this invention.
Figure 4A:
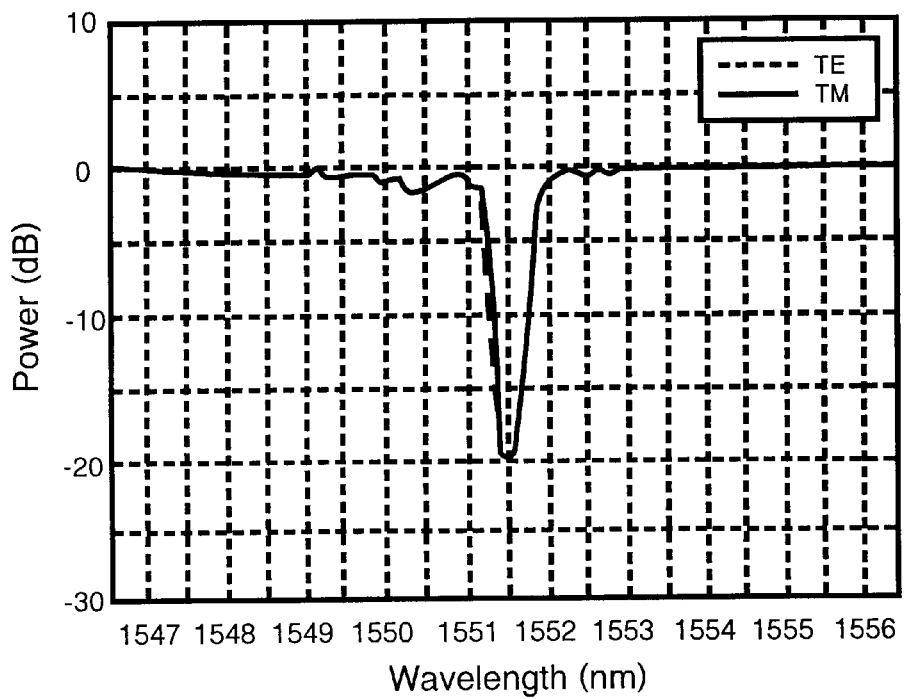
Figure 4B:
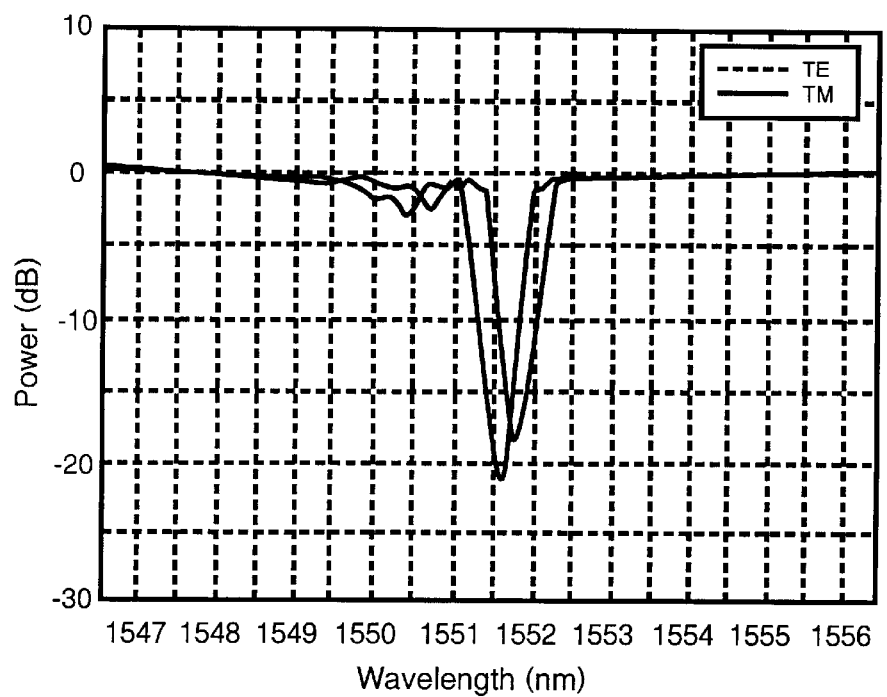
FIG. 4b is a graph illustrating Power (dB) versus wavelength (nm) for Bragg gratings written with UV-induced birefringence OFF.

Turning now to FIGS. 3a, and 3b graphs are shown, illustrating the effects of using a laser beam having spot width of 100 $\mu$m and 15 $\mu$m respectively. FIG. 5 illustrates the UV induced birefringence from the linear fits shown in FIGS. 3a and 3b. What becomes evident is that the slope of UV induced birefringence is opposite for the two beam spot sizes indicated. The result of utilizing this phenomenon is illustrated in FIGS. 4a and 4b where when UV induced birefringence is "ON" the device is polarization insensitive.

Of course numerous other embodiments may be envisaged, without departing from the spirit and scope of the invention. For example, although the preferred embodiment of the invention two beams of light are used, one after the other, in alternative embodiment a single beam having a step-wise non-uniform energy distribution that varies radially in, for example two discrete steps between a first region confined to substantially over the core and as second region confined to the cladding region adjacent to the core is practicable although somewhat more difficult to implement. This can be achieved by using an intensity mask to vary the intensity radially in this manner. In all instances, what is desirable is to control the ratio between the light energy impinging upon the core (or composite thickness layers upon the substrate), and the light energy impinging the region adjacent to the core.

Another embodiment of this invention relates to varying the refractive index over a length of the waveguide in order to lessen or obviate the inherent polarization sensitivity of the waveguide region itself. Such applications are useful for, example in trimming Mach Zehnder devices.

References to the beam width or spot size throughout this disclosure shall be construed as the dimension in the direction substantially perpendicular to the waveguide axis.

What is claimed is:

1. A method of inducing a region of modified refractive index in a planar waveguide device comprising the steps of:
providing a planar waveguide comprised of layers affixed to a substrate layer, wherein at least one of
(a) an optical property,
(b) density, and
(c) thermal coefficient of expansion of the substrate differs from that of the planar waveguide layers, the planar waveguide layers being substantially thinner than the substrate layer, the planar waveguide layers having a composite thickness of $t_l$ μm; and, irradiating the waveguide with a narrow beam of light and ensuring that the beam of light incident upon the planar waveguide is restricted to a width no greater than $t_l$ μm as the beam of light impinges upon the planar waveguide.

2. A method as defined in claim 1, further comprising the step of irradiating the waveguide with a wide beam having a width substantially greater than $t_l$ μm.

3. A method as defined in claim 2 wherein the waveguide is irradiated with the narrow and the wide beams simultaneously.

4. A method as defined in claim 3 wherein the narrow beam and the wide beam comprise a single beam of light having an intensity which varies radially in a predetermined manner.

5. A grating fabricated by the method of claim 1 wherein the narrow beam of light has periodic or aperiodic variations along a longitudinal axis of the waveguiding core layer.

6. A grating fabricated by the method of claim 1 wherein the irradiating beam of light has periodic or aperiodic variations along a longitudinal axis of the waveguiding core layer.

7. A method of providing an optical structure in a planar waveguide device comprising the steps of:
providing a layered structure having a composite thickness $t_l$ which includes a thin waveguiding core layer surrounded by cladding layers, the core layer having a thickness $nt_l$ where n<1.0, the layered structure being affixed to a substrate of thickness greater than $mt_l$ where m>5; and,
irradiating a portion of the waveguiding core layer with a beam of light for a sufficient duration and with a sufficient intensity to permanently change the refractive index of regions within the waveguiding core layer of the portion, the beam having a spot size of less than $t_l$.

8. A method of providing an optical structure in a planar waveguide device comprising the steps of:
providing a layered structure having a substrate layer of a thickness $t_s$ and a substantially thinner photosensitive waveguiding core layer surrounded by a cladding having a combined thickness of $t_l$; and,
irradiating a portion of the waveguiding core layer with a beam of light for a sufficient duration and with a sufficient intensity to permanently change the refractive index of regions within the waveguiding core layer of the portion, the beam having a diameter upon the planar waveguide device wherein 95% if its power is confined to an area of less than or equal to $t_l$.

9. A grating fabricated by the method of claim 8 wherein the irradiating beam of light has periodic or aperiodic variations along a longitudinal axis of the waveguiding core layer.

10. A method of providing an optical structure in a planar waveguide device comprising the steps of:
providing a layered structure having a substrate layer of a thickness $t_s$ and a substantially thinner waveguiding core layer surrounded by a cladding having a combined thickness of $t_l$; and,
irradiating a portion of the waveguiding core layer with a beam of light for a sufficient duration and with a sufficient intensity to permanently change the refractive index of regions within the waveguiding core layer of the portion, the beam having a diameter having a non-uniform intensity pattern that varies radially, the light energy impinging upon an area of a dimension $t_l$ or less over the waveguide core being substantially different from the light energy impinging upon other areas of the waveguide layers.

* * * * *